Patented June 21, 1938

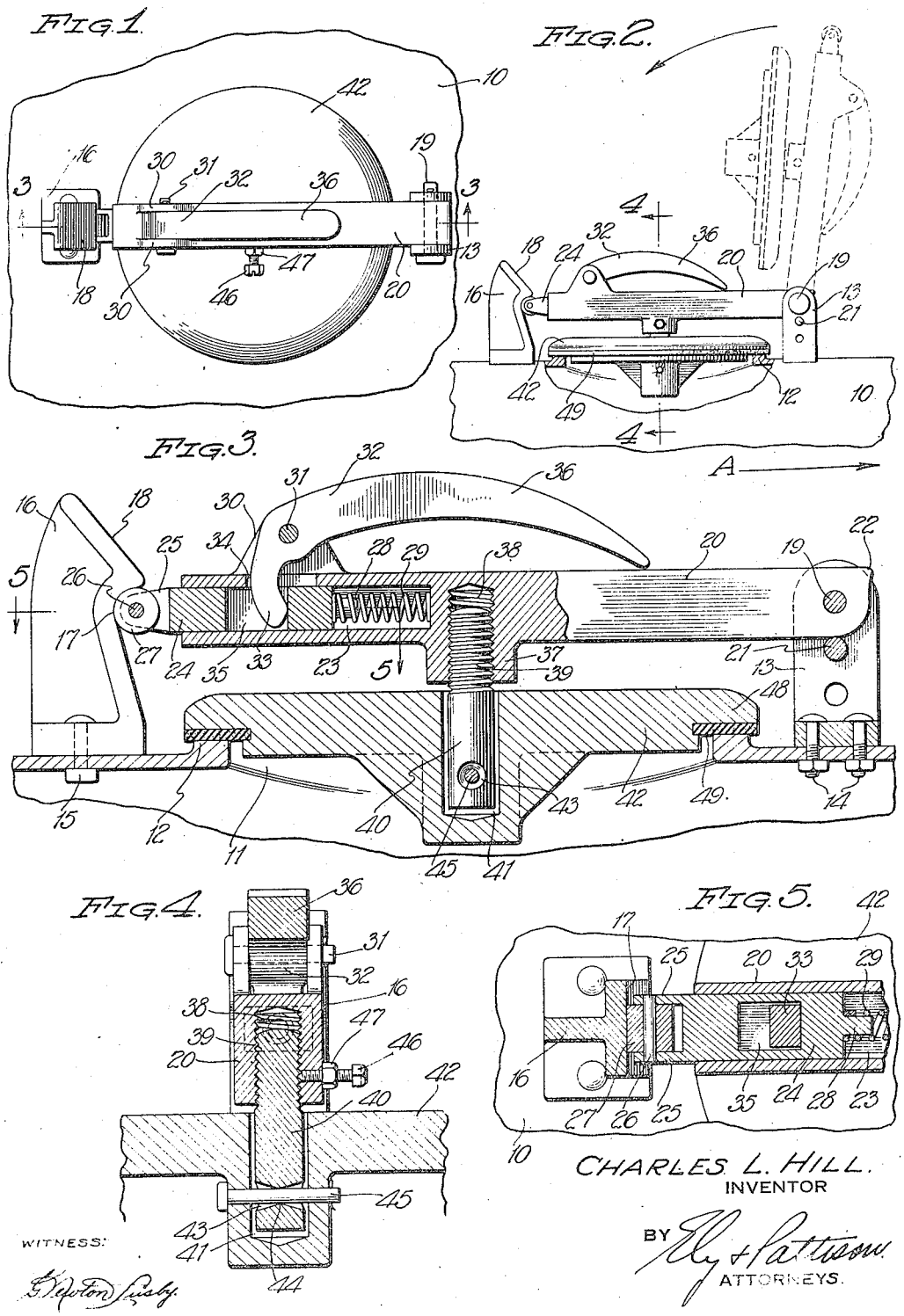

2,121,596

UNITED STATES PATENT OFFICE 2,121,596

SAFETY CLOSURE FOR TANK TRUCKS

Charles L. Hill, North Plainfield, N. J.

Application February 14, 1936, Serial No. 63,849

2 Claims. (Cl. 220—57)

This invention relates to improvements in closure devices and has particular reference to a safety closure for the filling opening of gasoline tank trucks.

Tank trucks for the transporting of gasoline and other like combustible liquids are generally equipped with screw closures for closing the filling openings in the tank which requires a manual turning action to secure the same in closed position. Such types of closures are objectionable for use on tank trucks, for should an attendant unknowingly fail to apply the screw cap closure, or fail to tightly seal the same, the contents of the tank will spill during travel of the truck and be exposed to the atmosphere resulting in evaporation and escape of fumes. This invention aims to assure closing of the filling opening of a tank truck even though an attendant should fail to manually actuate the closure to closing position, and which is accomplished by reason of the impulse imparted to the improved closure device by the forward movement of the tank truck.

Further, screw closures are objectionable in that they are difficult to open in an emergency. It is a safe practice to release the combustible contents of a tank truck through the filling opening should a tank truck upset in an accident to avoid the danger of an explosion. This invention aims to provide a pivoted latch closure which may be positively and rapidly opened should an emergency arise which necessitates such safety precautions.

Another feature of the invention resides in a releasable closure of the pivoted type which assures tight sealing of the filling opening.

A still further feature of the invention is the provision of a releasable sealing closure for the filling openings of tank trucks which is simple and inexpensive of construction, and which is adaptable for installation upon tank trucks now in use without altering the construction thereof.

With these and other objects in view, the invention resides in the certain novel construction, combination and arrangement of parts, the essential features of which are hereinafter fully described, are particularly pointed out in the appended claims, and are illustrated in the accompanying drawing, in which:

Figure 1 is a top plan view of a fragmentary portion of a tank truck showing my invention in closed position over a filling opening.

Figure 2 is a side elevational view with part of the tank broken away and shown in section, the dotted lines indicating the position of the closure when in open position.

Figure 3 is an enlarged vertical longitudinal section view on the line 3—3 of Figure 1.

Figure 4 is a vertical transverse sectional view on the line 4—4 of Figure 2.

Figure 5 is a fragmentary horizontal sectional view on the line 5—5 of Figure 3.

Referring to the drawing by reference characters, the numeral 10 designates a fragmentary portion of a tank truck of the kind generally employed for the transporting of gasoline and other combustible liquids. The top of the tank 10 is provided with an annular filling opening 11, which opening is surrounded by an upstanding seat flange 12. In Figure 2 of the drawing I have illustrated an arrow designated A which points toward the front end of the tank truck and fixedly attached to the top of the tank forward of the filling opening 11 is a U-shaped bracket 13. The bracket 13 may be secured to the tank 10 in any well known manner, but in the drawing bolts 14 are employed as the fastening means.

Fixedly secured by bolts or other fastening means 15 to the tank 10 diametrically opposite the bracket 13 is a latch keeper 16, the inner face of which is provided with a keeper recess 17 and with a beveled cam or guide face 18 for guiding the latch bolt hereinafter to be described into latching engagement with the keeper recess 17.

Pivoted at 19 between the upstanding ears of the U-shaped bracket 13 is one end of an arm 20, the pivoted end of the arm being partially rounded to clear a stop pin 21 extending transversely of the ears of the bracket 13 directly below the pivot 19. The pivoted end of the arm 20 is provided with a stop shoulder or projection 22 which engages the stop pin 21 to limit opening movement of the arm 20 and support the closure device in a cocked open position slightly forward of the axis of the pivot 19.

The free end of the arm 20 is provided with a recess 23 which is square in cross section to slidably and non-rotatably support a latch bolt 24. The outer end of the latch bolt 24 is provided with spaced ears 25 which serve as a bearing or support for a shaft 26 on which a roller 27 is rotatably mounted. The inner end of the latch bolt 24 is provided with a post 28 which telescopically receives one end of an expansion spring 29, the opposite end of the spring abutting the inner closed end wall of the recess 23. The spring 29 bearing against the inner end of the latch bolt 24 tends to normally urge the latch bolt outwardly, but permits yielding movement of the latch bolt by the actuating mechanism now to be described.

The top side of the arm 20 is provided with spaced ears 30 which serve as bearings for a pivot pin 31 on which an actuating lever 32 is pivoted. One end of the actuating lever 32 is provided with a nose 33 which extends through a slot 34 in the top wall of the recess 23 and enters a slot 35 in the latch bolt 24. The free end of the nose 33 constantly bears against the rear wall of the slot 35 and limits the outward movement of the latch bolt. The lever 32 is provided with a handle portion 36 which when grasped and moved outwardly serves to actuate the latch bolt 24 to retracted position against the tension of the spring 29.

The arm 20 is provided with a central downwardly extending boss 37, the said boss being in alinement with the axis of the filling opening 11 when the arm 20 is in closed position as shown in full lines in the drawing. Extending inwardly through the boss into the arm 20 from the underside is a threaded recess 38 which threadedly receives a threaded portion 39 of a connecting stud 40. The stud 40 extends from the arm and is freely received in a socket 41 extending downwardly from the top of a closure member 42. The stud is provided with a transverse passage 43, the walls of which converge inwardly from opposite ends of the passage as clearly illustrated in Figure 4, and the converging walls meet to provide a pointed bearing portion 44 of a diameter to snugly receive a pivot pin 45 which extends through the walls of the socket 41. This construction provides a flexible connection between the closure member 42 and the coupling stud 40 to enable the closure member 42 to positively engage the seat 12 as will be more fully explained hereinafter.

The thread connection between the coupling stud 40 and the arm 20 permits adjustment of the closure member 42 with respect to the seat 12 and with respect to the arm 20. After the closure member 42 has been adjusted, the same is prevented from turning by reason of a set screw 46 which threads through the boss 37 against the threaded portion 39 of the stud. A lock nut 47 when tightened against the boss 37 prevents accidental loosening of the set screw 46.

The closure member 42 is in the form of a disk plate and is provided with a peripheral flange 48, the under side of which carries a resilient gasket 49 which is engageable with the seat 12.

When the closure member 42 is in closed position with the gasket 49 engaging the seat 12, the roller 17 of the latch bolt 24 is engaging the keeper recess 17, thus the cover member 42 is locked in sealing position. To effect opening of the closure member 42, the operator grasps the handle 36 of the actuating lever 32 and pulls upwardly thereon to cause the nose 33 to move the latch bolt 24 to retracted position at which time the roller 26 is clear of the keeper member 16. With the latch bolt 24 in retracted position, the operator still grasping the handle 36 of the lever 32 pulls upwardly thereon to swing the arm 20 in a direction toward the forward end of the mobile tank 10 until the stop 22 engages the stop pin 21, whereupon the closure member will be disposed a very slight distance beyond the vertical plane away from the opening 11 the full open position being illustrated in dotted lines in Figure 2 of the drawing. Release of the lever 32 causes the spring 29 to extend the latch bolt and to return the lever 32 to its normal position with the free end of the manipulating portion 36 striking against the top face of the arm 20. With the closure device in cocked position just forward of the vertical axis of the pivot 19, only a slight force is necessary to swing the closure device in closed position. This may be done manually or should an attendant unknowingly forget to close the device, the same will drop automatically by the impulse imparted to the tank 10 by the forward movement of the truck on which the tank is mounted. Upon the closing movement of the closure device, the roller 27 at the free end of the latch bolt 24 strikes the cam guide face 18 of the keeper 16 which causes the latch bolt 24 to be forced inwardly against the tension of the spring 29 until such time as the roller clears the cam face 18, whereupon the spring 29 extends the latch bolt 24 outwardly causing the roller 27 to seat in the keeper recess 17, thus locking the closure member 42 in sealing engagement with the seat 12. By reason of the flexible connection between the closure member 42 and the arm 20, a positive sealing is obtained without in any way disturbing the free movement of the arm 20 to its horizontal locking position.

This improved latch closure device in addition to providing a positive seal for the filling opening, will also be found helpful in an emergency for releasing the contents of the tank 10 should an accident occur where the tank truck is upset. When such accidents occur, it is advisable for safety reasons to avoid explosion, to release the combustible contents of the tank, and this may be accomplished by actuating the lever 32 to move the closure device to an open position.

While I have shown and described what I consider to be the most practical embodiment of my invention, I wish it to be understood that such changes and alterations as come within the scope of the appended claims may be resorted to if desired.

Having thus described the invention, what I claim as new and desire to secure by Letters Patent, is:—

1. In combination, a truck tank having an opening, a seat surrounding said opening, a cover member, a resilient gasket carried by said cover member for sealing engagement with said seat, an arm having one end pivotally connected to said tank forward of said opening, a coupling stud having one end threaded into a threaded socket in said arm, means preventing turning movement of said stud relative to said arm, a socket provided in said cover member freely receiving the other end of said stud, a connecting pin extending through the walls of said socket and through a passage in said stud, the walls of said passage converging inwardly from opposite ends to provide a flexible connection between said stud and cover member to assure positive seating between said gasket and seat, releasable latch means for preventing swinging movement of said arm when said cover member is in closed position, and cooperating means between said arm and said tank for holding the cover member open a slight distance beyond the vertical plane away from said opening.

2. In combination, a truck body having a filling opening in the top thereof, a seat surrounding said filling opening, a cover member, an arm having one end pivotally connected to said tank forward of said opening, a coupling stud having one end threaded into said arm from the underside thereof, a socket provided in said cover and opening onto the top thereof and freely receiving the opposite end of said stud, a connecting pin extending transversely through the walls of said socket and freely through a transversely disposed opening in said stud to provide a flexible connection between said stud and cover member to assure positive seating of said cover member upon said seat, releasable latch means for preventing swinging movement of said arm when said cover member is in closed position, and cooperating means between said arm and said tank for holding the cover member open a slight distance beyond the vertical plane away from said filling opening.

CHARLES L. HILL.